(12) United States Patent
Rhodes et al.

(10) Patent No.: US 8,219,024 B2
(45) Date of Patent: Jul. 10, 2012

(54) UNDERWATER DATA TRANSFER SYSTEM

(75) Inventors: Mark Rhodes, West Lothian (GB);
Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 226 days.

(21) Appl. No.: 12/691,085

(22) Filed: Jan. 21, 2010

(65) Prior Publication Data

US 2010/0183313 A1 Jul. 22, 2010

(51) Int. Cl.
*H04B 13/02* (2006.01)

(52) U.S. Cl. ........... 455/40; 455/9; 455/14; 398/105

(58) Field of Classification Search .......... 455/40, 455/9, 14, 67.11, 115.1, 414.1; 398/105, 398/107, 108

See application file for complete search history.

(56) References Cited

U.S. PATENT DOCUMENTS

| | | | | |
|---|---|---|---|---|
| 4,069,469 A * | 1/1978 | Masaharu | ............... | 367/2 |
| 4,606,049 A * | 8/1986 | Daniel | ............... | 375/272 |
| 5,532,478 A * | 7/1996 | Kogure | ............... | 250/227.24 |
| 6,108,267 A * | 8/2000 | Pearce | ............... | 367/20 |
| 6,236,776 B1 * | 5/2001 | Sakuyama | ............... | 385/24 |
| 6,272,072 B1 * | 8/2001 | Wulich et al. | ............... | 367/124 |
| 6,568,823 B1 * | 5/2003 | Fielding et al. | ............... | 362/101 |
| 7,058,305 B2 * | 6/2006 | Horinouchi et al. | ............... | 398/105 |
| 7,133,611 B2 * | 11/2006 | Kaneko | ............... | 398/30 |
| 7,327,705 B2 * | 2/2008 | Fletcher et al. | ............... | 370/331 |
| 2003/0117025 A1 | 6/2003 | Rouquette | | |
| 2005/0082467 A1 * | 4/2005 | Mossman | ............... | 250/227.16 |
| 2005/0200699 A1 * | 9/2005 | Kim | ............... | 348/81 |
| 2006/0094422 A1 * | 5/2006 | Crooks | ............... | 455/431 |
| 2008/0157970 A1 * | 7/2008 | Single et al. | ............... | 340/572.1 |
| 2008/0171512 A1 | 7/2008 | Jack | | |
| 2011/0003558 A1 * | 1/2011 | Alkan | ............... | 455/67.14 |
| 2011/0058814 A1 * | 3/2011 | Camilli et al. | ............... | 398/104 |

FOREIGN PATENT DOCUMENTS

| | | |
|---|---|---|
| EP | 0356090 A2 | 2/1990 |
| GB | 2267628 A | 6/1993 |
| GB | 2407334 | 4/2005 |
| GB | 2423654 | 8/2006 |
| JP | 2007323391 A | 12/2007 |
| WO | 2006/134331 | 12/2006 |
| WO | WO2007072066 A1 | 6/2007 |

* cited by examiner

*Primary Examiner* — Minh D Dao

(74) *Attorney, Agent, or Firm* — Paul Davis; Goodwin Procter LLP

(57) ABSTRACT

The present invention relates to a system that provides flexible data access to a wired underwater communications network through an electromagnetic, non-conductive connection. An underwater data access point is described wherein data access to a cabled network is provided through an electromagnetic connection. An inductive connector system may also be provided to allow transfer of data and/or power between a data access point and a client system.

12 Claims, 14 Drawing Sheets

UNDERWATER DATA TRANSFER SYSTEM

CROSS-REFERENCE TO RELATED APPLICATIONS

This application claims the benefit of GB 0900946.5, filed on Jan. 21, 2009, which application is fully incorporated herein by reference.

INTRODUCTION

The present invention relates to a system that provides flexible data access to a wired underwater communications network through an electromagnetic, non-conductive connection system.

BACKGROUND

Subsea industrial and scientific installations have seen significant growth in recent years and wired data networks are now being installed to support these activities.

Multi-cored conductive umbilical cables have been used historically to support wired data communications. Fibre optic based network systems are also an established method of carrying data under water. Submarine fibre optic cables are capable of greater single hop distances between repeaters than electrical conductive cable based systems and are not subject to single point failure through water penetration of an insulating jacket in the same way that conductive cables are. Single fibres are also capable of supporting much higher data transmission rates than a single conductive link. Conductive wires and optical fibres can both be classed as cabled networks.

Cabled underwater networks have operational limitations that are particular to their deployment in the underwater environment. Communications access points have to be designed in and manufactured ahead of cable deployment since cutting and splicing a connection is not practical underwater. This is often inconvenient when changing circumstances result in the need to implement additional connections. Even where a connector has been provisioned close to the desired communication point the type of connection may not allow expansion of the number remote client systems accessing the cabled network through the available connector.

Fault finding is also problematic under water since submerged cables cannot be probed to test continuity in the way that above water cable links are commonly tested.

In contrast wireless underwater communications systems, implemented through acoustic or radio carriers, avoid many of these practical limitations. However, wireless underwater communications systems cannot at present support broadband long range communications and cannot deliver electrical power.

There is need for an underwater communications system which combines the operational benefits of cabled and wireless systems.

SUMMARY OF INVENTION

According to one aspect of the present invention there is provided an underwater data transfer system comprising a cabled network having at least one data access point and a remote client system comprising a client electromagnetic transceiver. During use, the data access point interfaces data carried on the cabled network between the data access point and the client electromagnetic transceiver via electromagnetic signals carried through the water. The data access point and remote client system may also be provided with inductive connectors which allow the transfer of electrical power between the systems. Electrical power may be carried by the cabled network.

The underwater data transfer system of the present invention combines the advantages of a cabled network for power delivery and long range high bandwidth communications with flexible wireless access over a short range remote underwater area.

The networked communications signal is carried over a cabled network comprising a fibre optic or electrically conductive cable.

Electrical power may be transmitted from the data access point to the remote client system or power may be supplied from the remote client system, through the data access point, to the cabled network.

An electromagnetic carrier signal may be transmitted through the water to communicate data between the data access point and remote client system and this method also allows multiple remote client systems to communicate with a common data access point.

For deployments where the underwater data transfer system is sited on the seabed may form part of the communications path and this will extend communications range for a given bandwidth due to the lower conductivity of the seabed relative to an entirely sea water signal path.

An inductive connector may also be used for transfer of data between the data access point and remote client system.

According to yet another aspect of the present invention two remote client systems may be linked by a second cabled network to provide cabled network communications between remote client systems.

BRIEF DESCRIPTION OF DRAWINGS

Various aspects of the invention will now be described by way of example only and with reference to the accompanying drawings, of which.

DETAILED DESCRIPTION OF THE DRAWINGS

This system differs from a simple wireless connector component in that the data is added to a multiplexed data stream rather than a simple connector system which would give serial conductive contact to a dedicated wire in a multi-channel umbilical.

Figure 1:
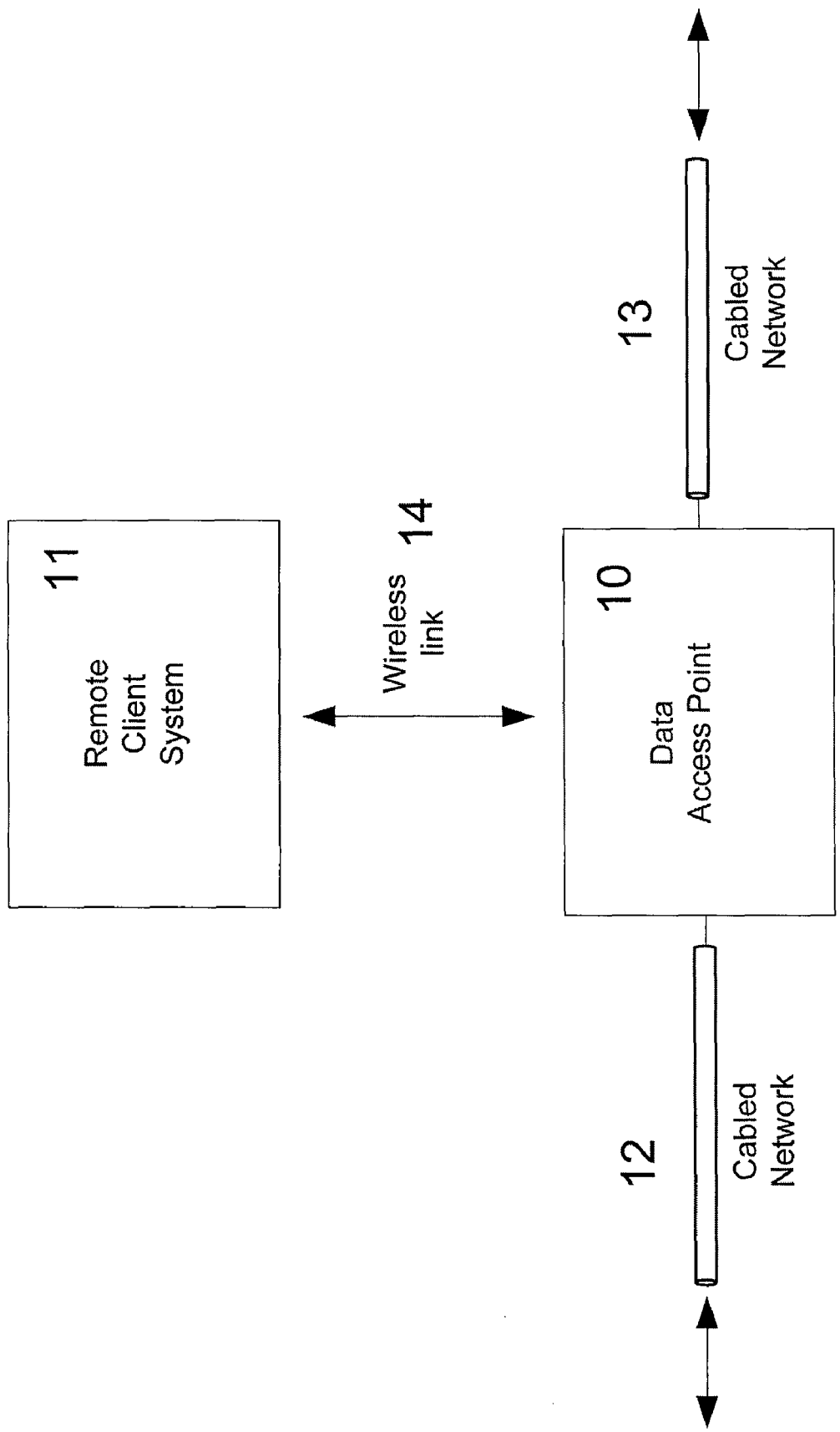
FIG. 1 shows a top level block diagram for a wireless access point interfaced with a cabled network

FIG. 1 shows a top level block diagram for an underwater data transfer system comprising a remote client system 11 interfaced with cabled network 12 and 13. Data access point 10 accesses data and electrical power carried by cabled network 12 and 13. Cables 12 and 13 represent cabled network connections to data access point 10. Data access point 10 also provides a wireless communications link 14 with at least one remote client system 11. The cabled network 12 and 13 may be constructed from multiple cores consisting of electrically conductive wires, optical fibres or a mixture of both with an associated conductive link providing electrical power where required. Wireless interconnection 14 may be implemented as a remote electromagnetic link or as a short range inductive link in mechanical contact to ensure close alignment. Wireless link 14 may provide electrical power to remote client system 11 or allow remote client system 11 to provide power to data access point 10. The underwater data transfer system could equally be configured as a cabled network terminating node with only one active cabled network connection.

Figure 2:
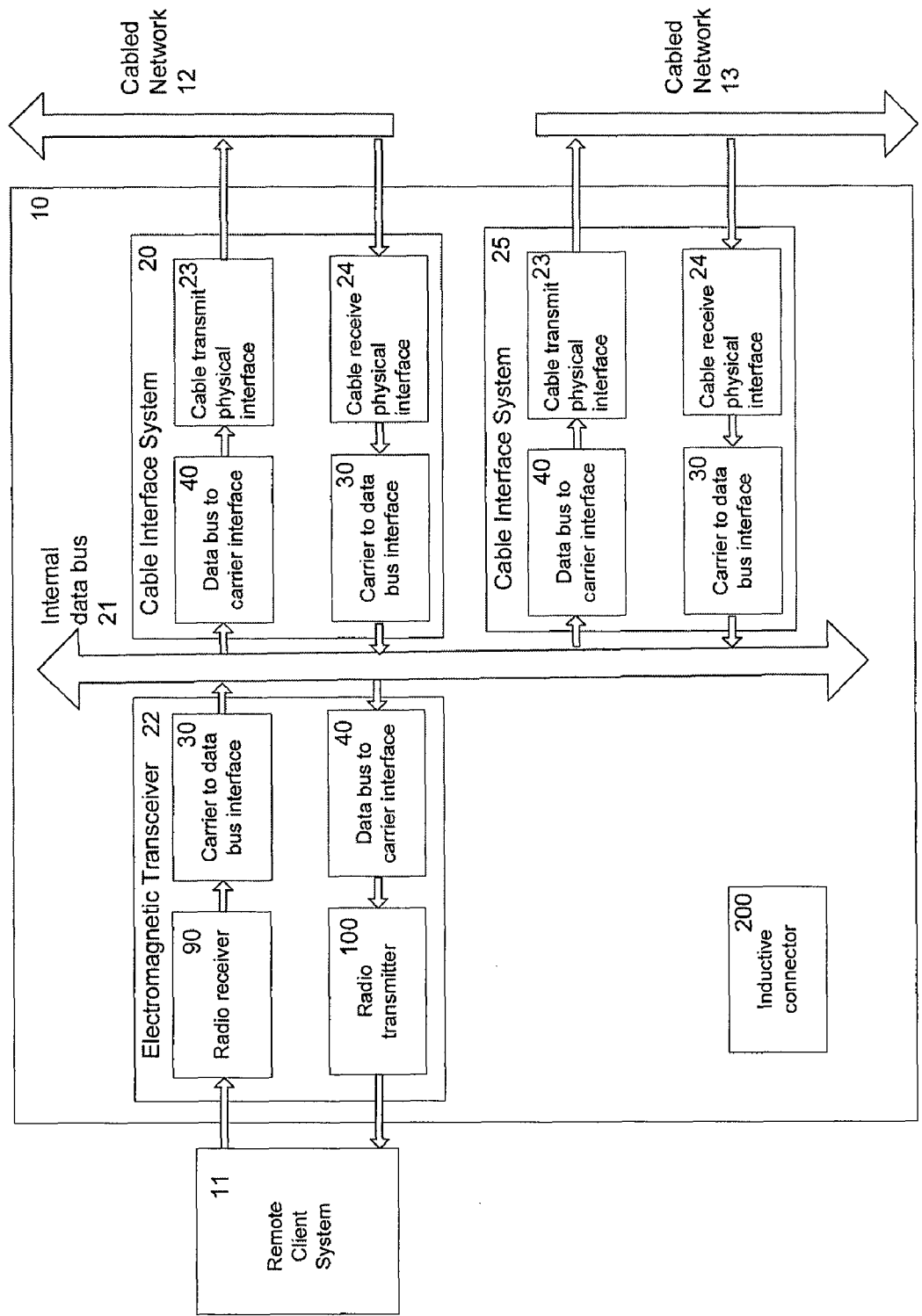
FIG. 2 shows a block diagram of the network access point

FIG. 2 shows a block diagram of data access point 10. Cable interface systems 20 and 25 provide access to data carried over the cabled network connection. Cable interface 20 extracts data from the network that is addressed to remote client system 11 which is carried over an internal data bus 21 to electromagnetic transceiver 22. Data originating at the remote client system 11 is received at electromagnetic transceiver 22 and carried over the internal data bus 21 to cable interface 20 which inserts the data into the cable network protocol addressed to its intended destination. Cable interface 25 performs the same function as cable interface 20 for the cable connections on the other side of the cabled network.

Cable receiver 24 recovers the modulated signal from the cabled network. Carrier to data bus interface 30 extracts data from the network that is addressed to remote client system 11 which is carried over internal data bus 21 to electromagnetic transceiver 22. Within electromagnetic transceiver 22 data bus to carrier interface 40 presents formatted data to radio transmitter 100. Data originating at the remote client system 11 is received at electromagnetic transceiver 22 by radio receiver 90 which routes data through carrier to data bus interface 30. Data is then carried over the internal data bus 21 to data bus to carrier interface 40 which supplies formatted data to cable transmitter interface 23.

Figure 3:
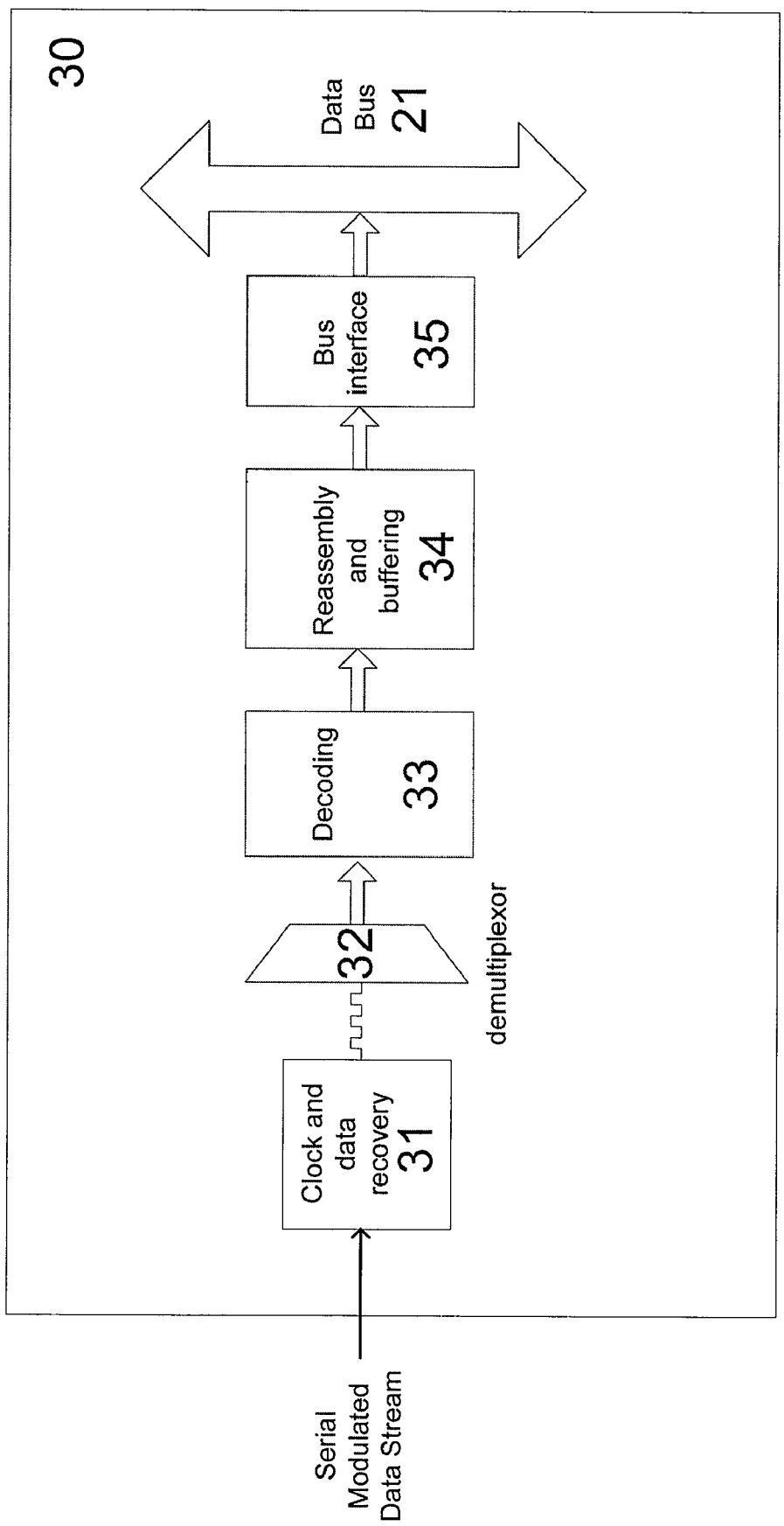
FIG. 3 shows an example implementation of a carrier to data bus interface

FIG. 3 shows an example implementation of a carrier to data bus interface 30. Clock and Data Recovery 31 reconvert the received and processed serial signal into a serial bit stream. Clock and data recovery 31 locks onto the frequency and phase of the incoming signal and extract the clock signal by a phase-locked loop. This clock signal is then used to check the incoming signal at every clock period. In this way, the digital serial bit stream is recovered along with the clock. Once the serial bit stream has been recovered, data is converted back into parallel data words by the receive de-multiplexor 32. Receive Decoding 33 converts coded "scrambled" serialised data back to the data's original form. When receiving data the original data is restored and placed in local Buffering/Framing memory 34. It remains here until the bus interface circuitry places it on data bus 21. When the data link is receiving data, the receiver bus interface 35 notifies the local bus 21 that information has been received and is going to be put on the bus. It then maps the data from the data link format to the specific bus format.

Figure 4:
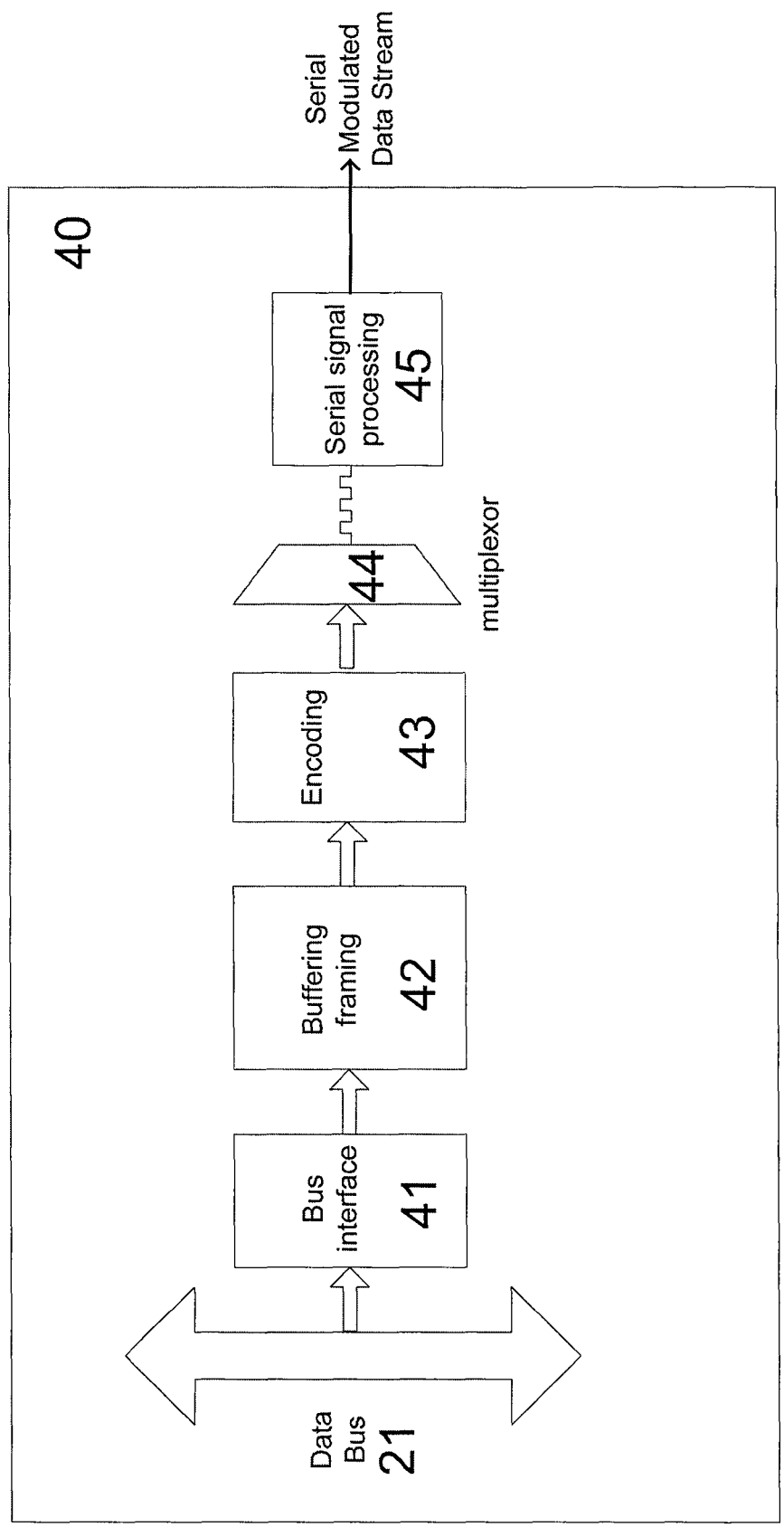
FIG. 4 shows an example implementation of a data bus to carrier interface

FIG. 4 shows an example implementation of a data bus to carrier interface 40. Internal data bus 21 supplies data to the transmitter bus interface. Transmitter Bus Interface 41 interfaces directly with data bus 21, recognises requests to send data, pulls the data off bus 21 and maps data from the bus format to the data communication link format. Transmitter Buffering/Framing 42 stores parallel data from the bus in local memory and partitions this large block of data into frames (small blocks). Overhead (additional frames) may be inserted including address error tolerance, and LAN management information. All frames are then sent sequentially to transmitter-encoding circuitry 43. Transmit Encoding 43 converts the data from an original value to a prescribed and "scrambled" value, which when serialized, ensures that the communications link will function properly. Since this conversion is "prescribed," the receiver side of a data communication link can convert the received signal back into the data's original form. Transmit Multiplexor 44 serialises the parallel data as a data communication link can transmit only one data bit at a time along the same cable or through a single radio channel. The serial bit stream goes to the Serial Signal Processing circuitry 45. Transmit Serial Signal Processing 45 changes the digital serial bit stream into a form appropriate for the transmission medium. Data is encoded onto a carrier signal through digital or analogue modulation schemes well known to those skilled in this area.

Figure 5:
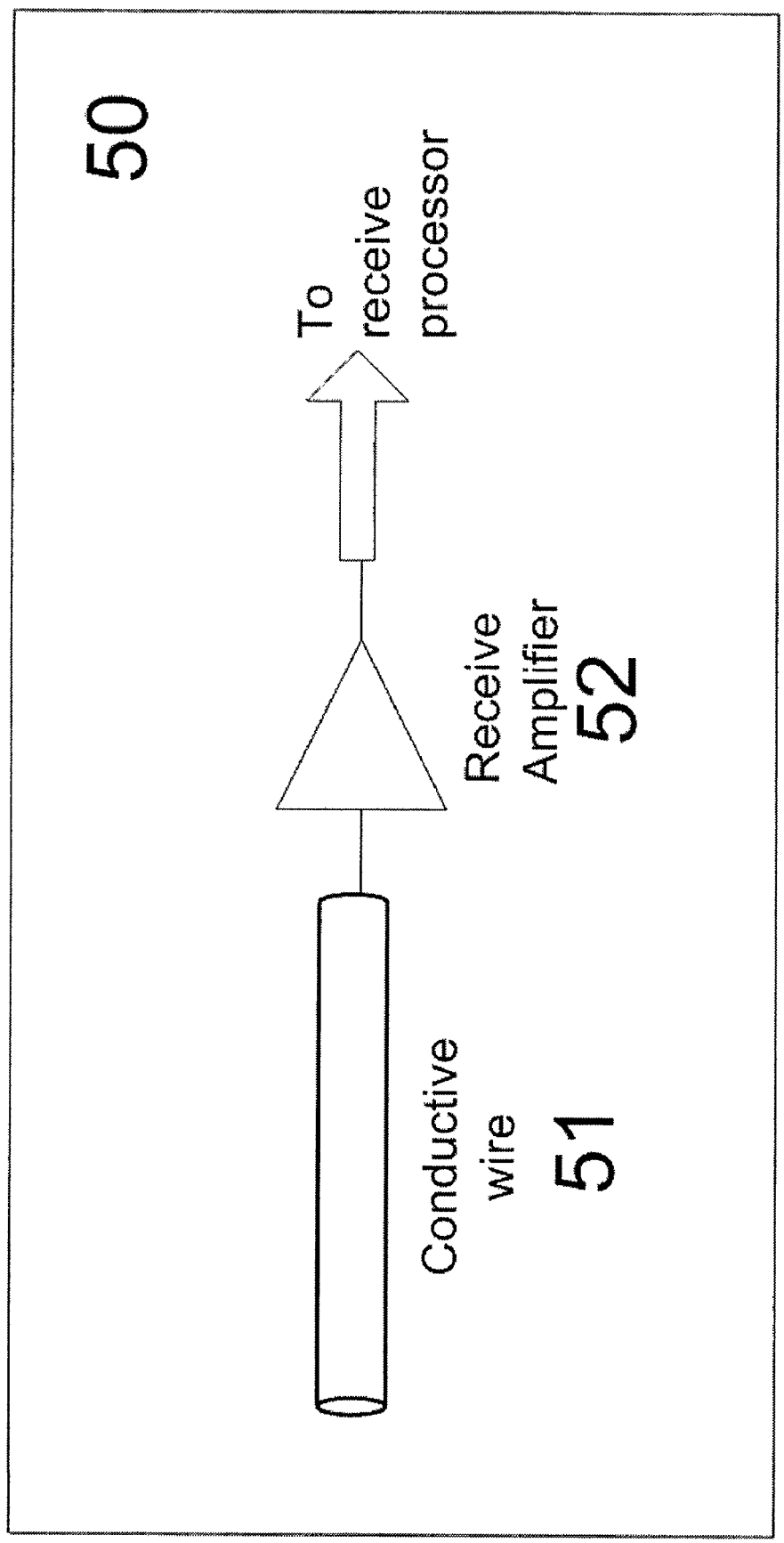
FIG. 5 shows an example implementation of a physical layer conductive wire cable receiver

FIG. 5 shows an example implementation of a physical layer conductive wire cable receiver 50 suitable for use as cable receive physical interface 24. Receive amplifier 52 is conductively connected to the incoming conductive network cable 51 which is a component of cabled network 12 and/or 13. Typically, receive amplifier 52 performs an equaliser function to compensate for frequency distortion introduced by cable transmission. Receiver amplifier 52 passes the conditioned signal to carrier to data bus interface 30.

Figure 6:
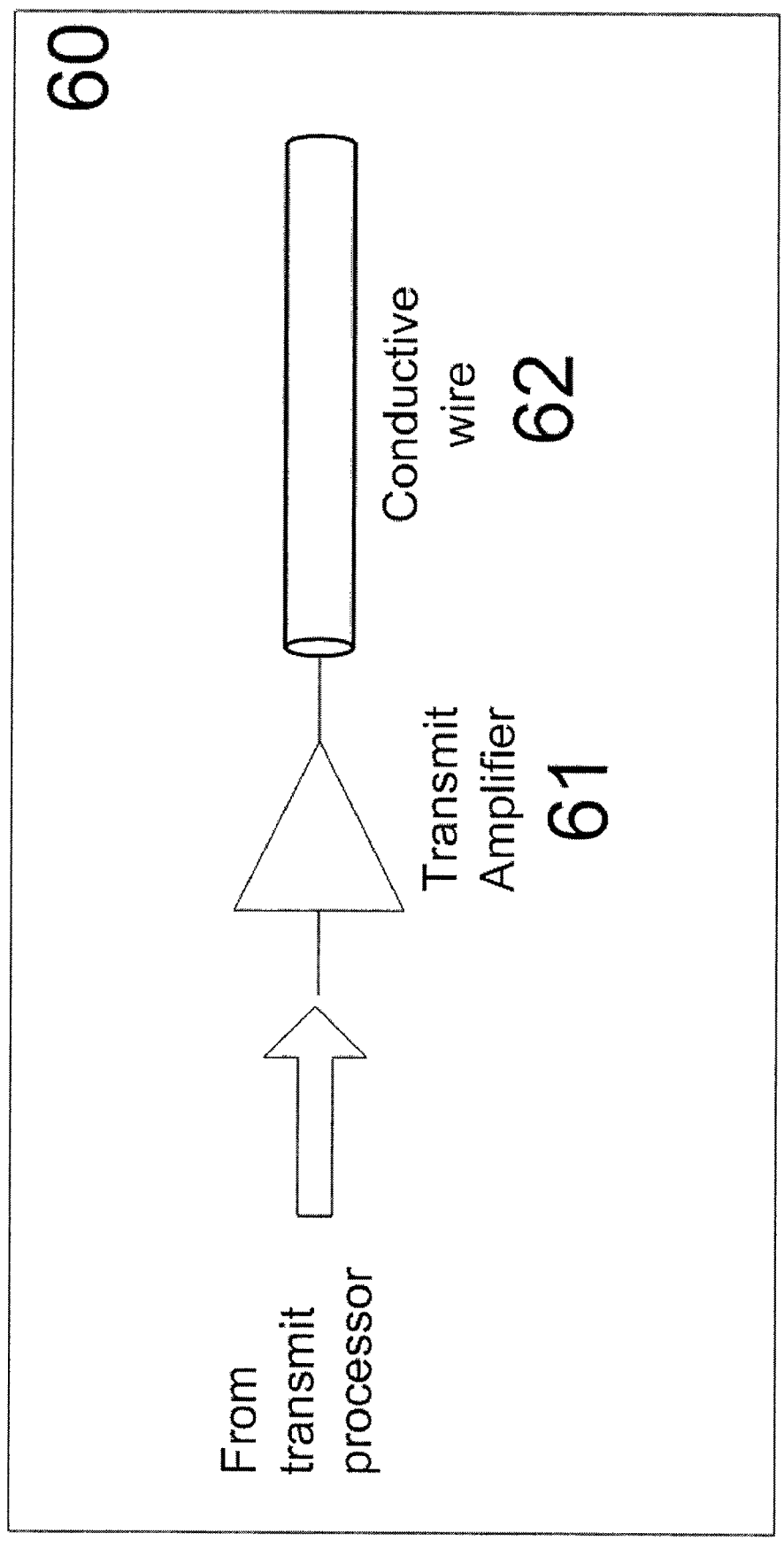
FIG. 6 shows an example implementation of a physical layer conductive wire cable transmitter

FIG. 6 shows an example implementation of a physical layer conductive wire cable transmitter 60 suitable for use as cable transmit physical interface 23. Bus to carrier interface 40 passes formatted data, in the form of a modulated carrier, to transmit amplifier 61 for amplification and onward transmission through conductive cable 62 which is a component of cabled network 12 and/or 13.

Figure 7:
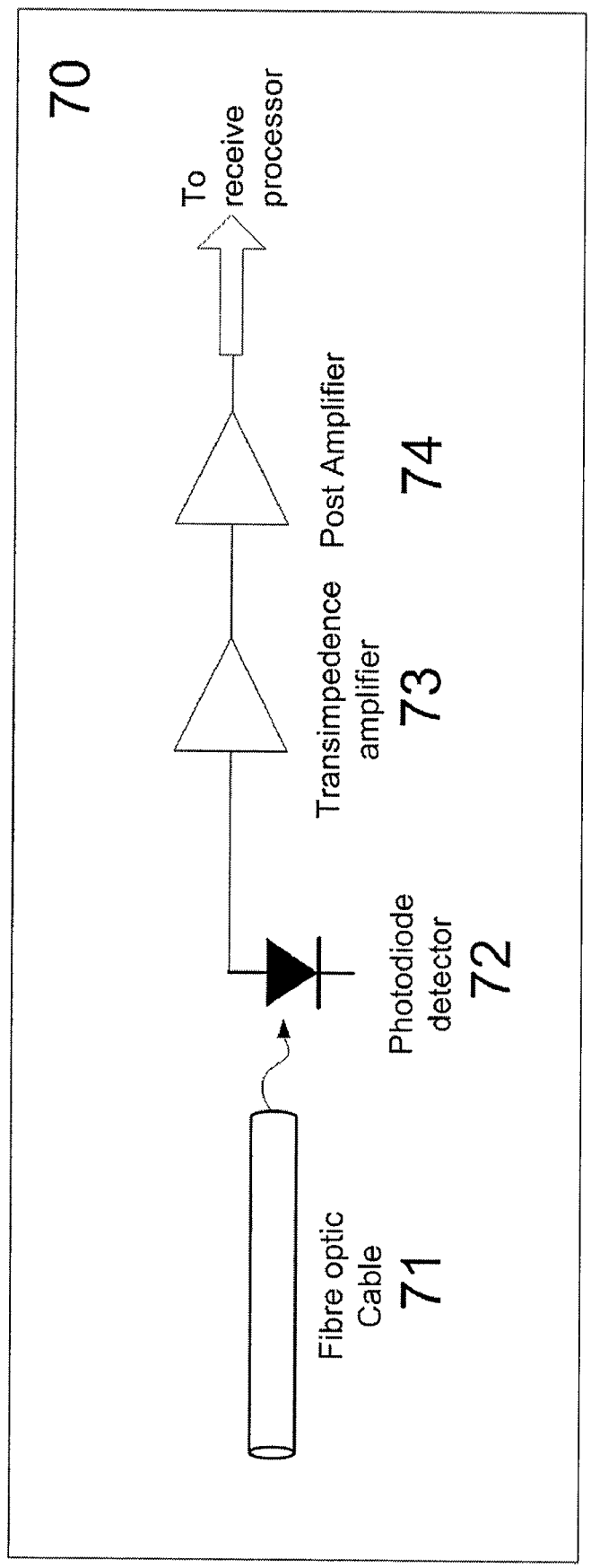
FIG. 7 shows an example implementation of a physical layer fibre optic cable receiver

FIG. 7 shows an example implementation of a physical layer fibre optic cable receiver 70 suitable for use as cable receive physical interface 24. Photodiode detector 72 detects the incoming signal from fibre optic cable 71 which is a component of cabled network 12 and/or 13 and converts it to an electrical signal, which can be processed by the receive circuitry. This signal is converted from current to voltage by a trans-impedance amplifier 73 then amplified by fixed or variable gain amplifier 74 before passing on to carrier to bus interface 30.

Figure 8:
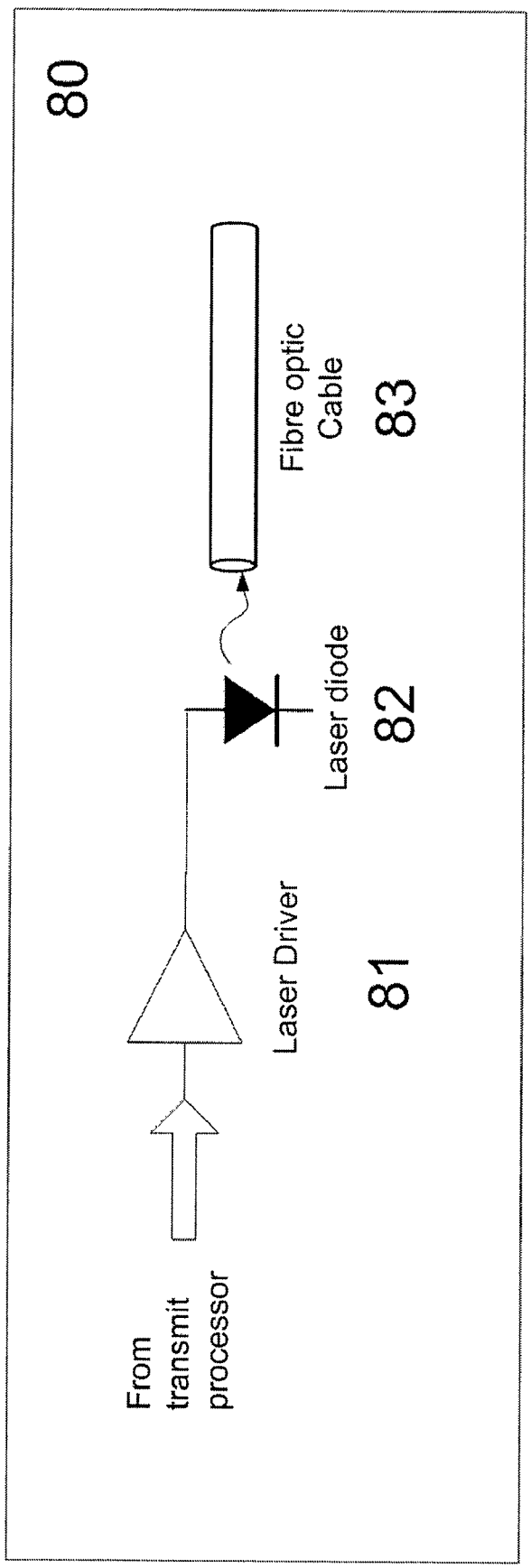
FIG. 8 shows an example implementation of a physical layer fibre optic cable transmitter

FIG. 8 shows an example implementation of a physical layer fibre optic cable transmitter 80 suitable for use as a cable transmit physical interface 23. Bus to carrier interface 40 passes formatted data to laser driver 81 which converts the input voltage signal to a current drive signal for Laser Diode 82 which couples light into optical cable 83. Optical cable 83 is a component of cabled network 12 and/or 13.

Figure 9:
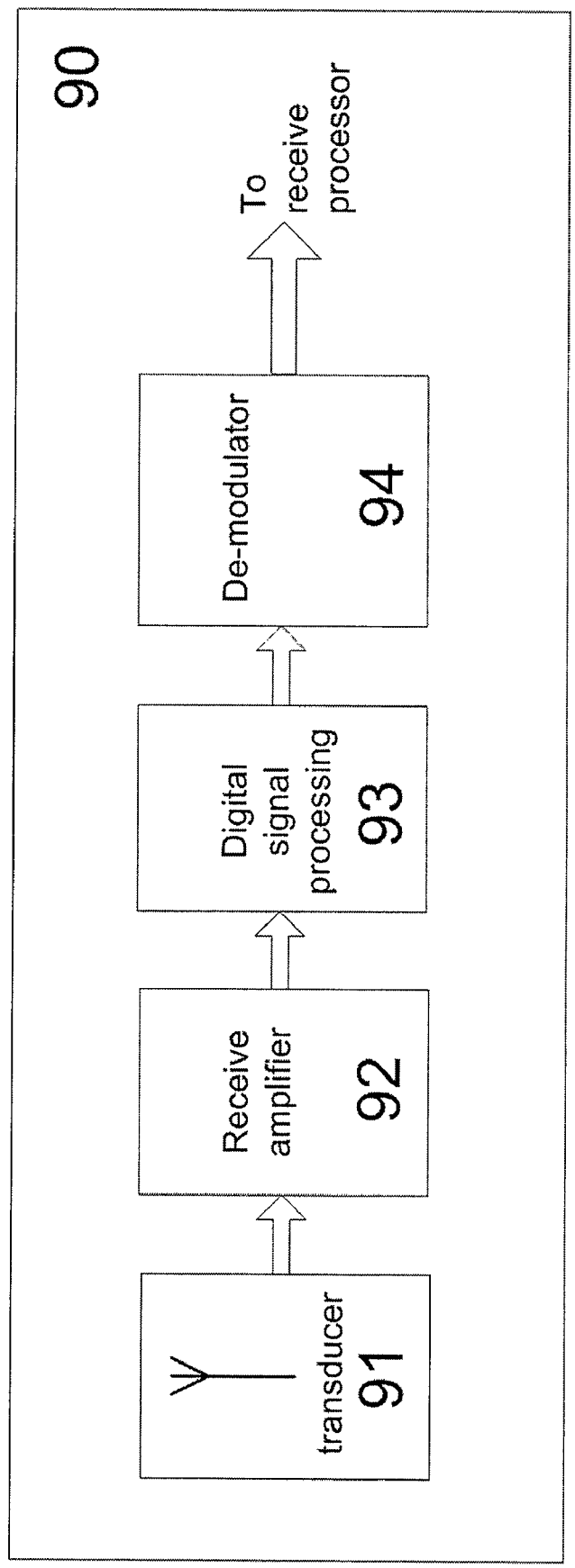
FIG. 9 shows an example implementation of a physical layer radio receiver

FIG. 9 shows an example implementation of physical layer radio receiver 90. Transducer 91 converts an electromagnetic signal in the water to an electrical signal at the input to receive amplifier 92. Transducer 91 may be implemented as a loop antenna, a solenoid, solenoid formed around a high relative permeability material, a pair of contacts in direct conductive contact with the water; an inductive connector capable of linking data and power with the remote client system. Receive amplifier 92 is designed to increase the received signal amplitude while minimising added electrical noise and may also perform a frequency band limiting function. Digital signal processor 93 further conditions the received signal and may include frequency and phase compensation for distortion introduced by transmission through water. De-modulator 94 implements the process of recovering data from the modulated received carrier signal.

Figure 10:
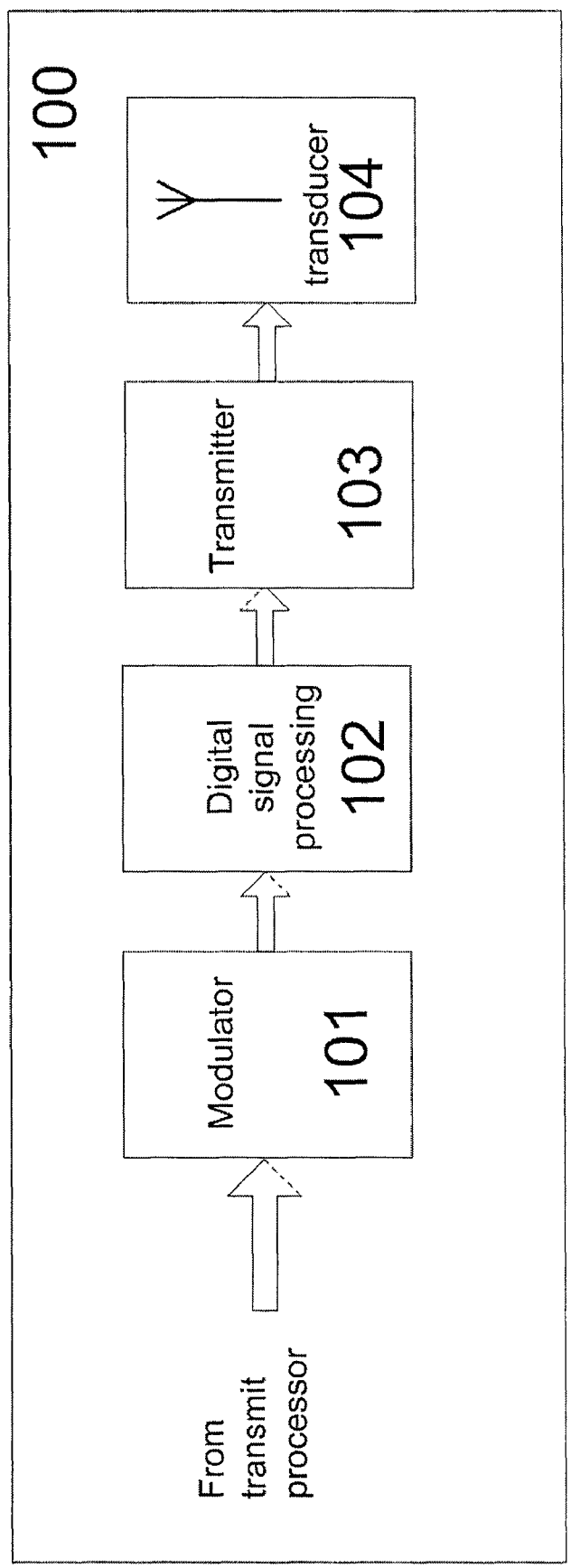
FIG. 10 shows an example implementation of a physical layer radio transmitter

FIG. 10 shows an example implementation of physical layer radio transmitter 100. Data bus to carrier interface 40 of FIG. 2 supplies formatted data to modulator 101. Modulator 101 encodes a carrier signal with a digital or analogue representation of the data and passes the signal to digital signal processing module 102. Transmitter 103 generates the drive signal appropriate for the selected conducted to electromagnetic transducer 104. Transducer 104 may be implemented as a loop antenna, a solenoid, a solenoid formed around a high relative permeability material, a pair of contacts in direct conductive contact with the water or an inductive connector capable of linking data and power with the remote client system.

A cabled network communications signal must satisfy signal to noise ratio and other distortion criteria to achieve reception at the data destination. These signal properties degrade over transmitted distance and communications networks typically transmit electrical conducted power to support periodic signal recovery, re-timing and amplification at points along the cable to extend the network's operational length. In the embodiment of the present invention depicted in FIG. 2, this common signal recovery function is applied to signals as they route directly through cable interface system 20. Cable receiver 24 recovers the modulated signal from the cable medium. Carrier to data bus interface 30 extracts data that is then carried over the internal data bus 21 to data bus to carrier interface 40 which supplies formatted data to cable transmitter interface 23. In some implementations of the present invention this signal recovery and conditioning function could beneficially be combined with a wireless data access point.

The use of wireless communications in the data transfer system of the present invention provides the flexibility of connecting additional or replacement equipment after network deployment. A cabled network provisioned with wireless data access points can support additional clients over and above that anticipated at the system design stage.

Network fault finding is problematic under water since submerged cables cannot be probed to test continuity in the way that above water cable links are commonly tested. The wireless data access point of the underwater data transfer system of the present invention provides a means for monitoring the network and the quality of service at discrete points along the network. For example, remote client systems may interface with the various data access points of the data transfer system of the present invention to provide information regarding the quality of service present at the corresponding data access points in order to diagnose the location of a failed section of cable. Thus the present invention provides a means to locate a failure point in an underwater cabled network.

Figure 11:
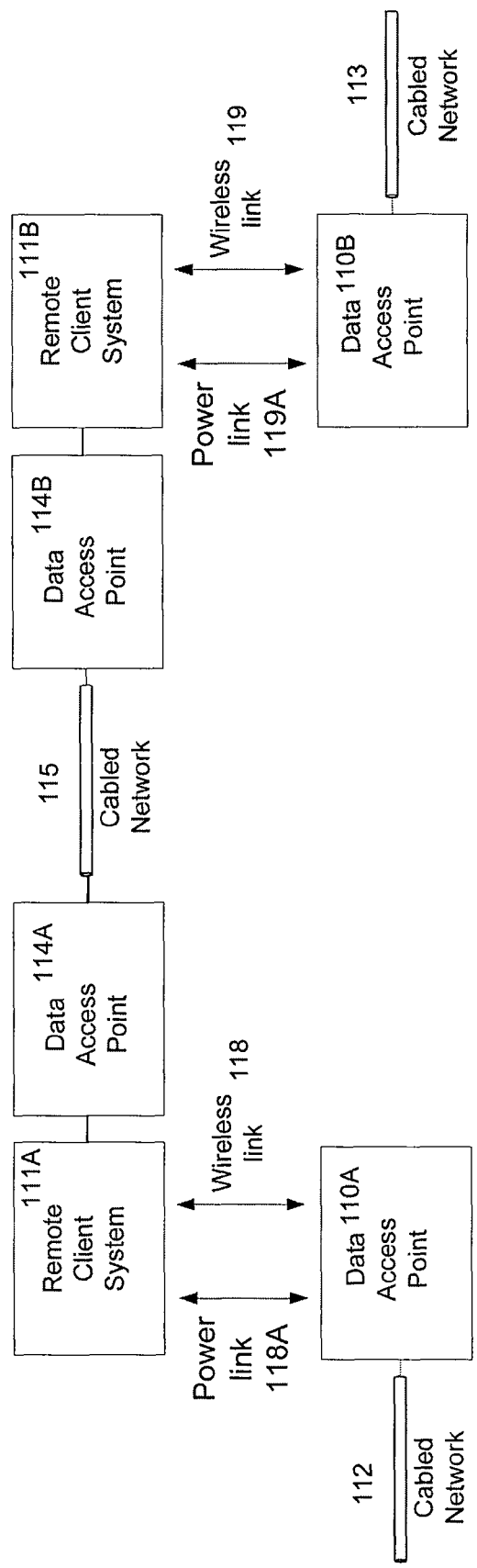
FIG. 11 shows a block diagram of a cabled network bridging configuration

FIG. 11 shows a block diagram of a data transfer system according to an embodiment of the present invention which uses two remote client systems 111A, 111B connected by a secondary cabled network 115 to allow data link bridging between two separate cabled networks 112 and 113. Cabled network 112 interfaces with data access point 110A which provides a wireless data link that transfers data 118 or data and power 118A to remote client system 111A. Remote client system 111A interfaces with data access point 114A which transfers data between the internal data bus of remote client system 111A and secondary cabled network 115. Secondary cabled network 115 interfaces with data access point 114B which interfaces to the internal data bus of remote client system 111B. Remote client system 111B provides a wireless data link that transfers data 119 or data and power 119A between remote client system 111B and data access point 110B. Data access point 110B interfaces with cable network 113 for onward transmission of data.

The data transfer system of the present invention depicted in FIG. 11 allows the bridging of a failed section of network cable and may also simplify network cable deployment which can be accomplished in sections.

Figure 12:
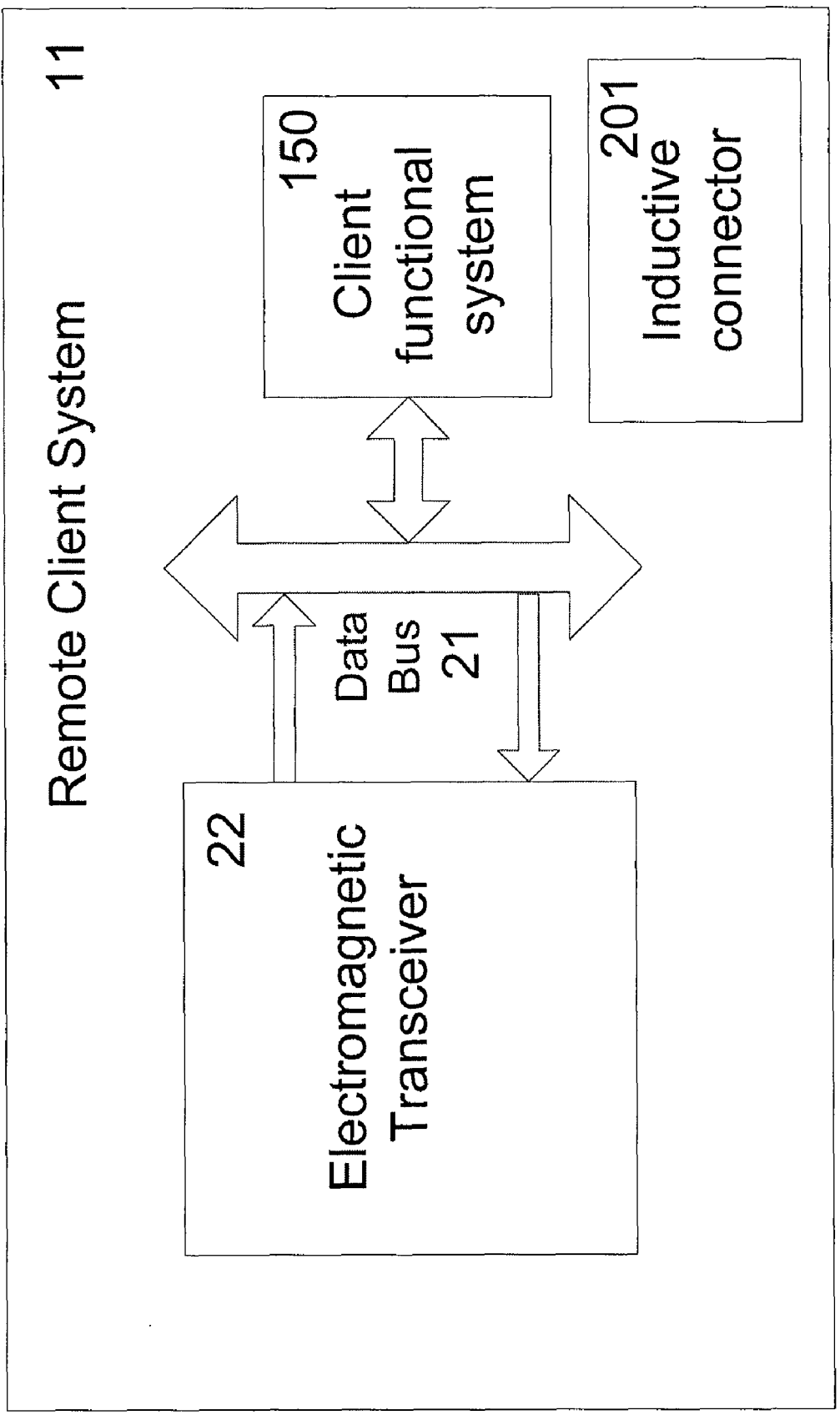
FIG. 12 shows the top level block diagram of a remote client system

FIG. 12 shows a top level block diagram of an embodiment of a remote client system 11 according to the present invention and corresponding to numeral 11 of FIG. 1. Electromagnetic transceiver 22 (FIG. 1) communicates between remote client system 11 and a data access point 10. Electromagnetic transceiver 22 interfaces with internal data bus 21 which in turn interfaces with client functional system 150. Client functional system 150 may for example comprise instrumentation, a sensor device or a mechanical actuator which may be controlled over the underwater data transfer system.

Figure 13:
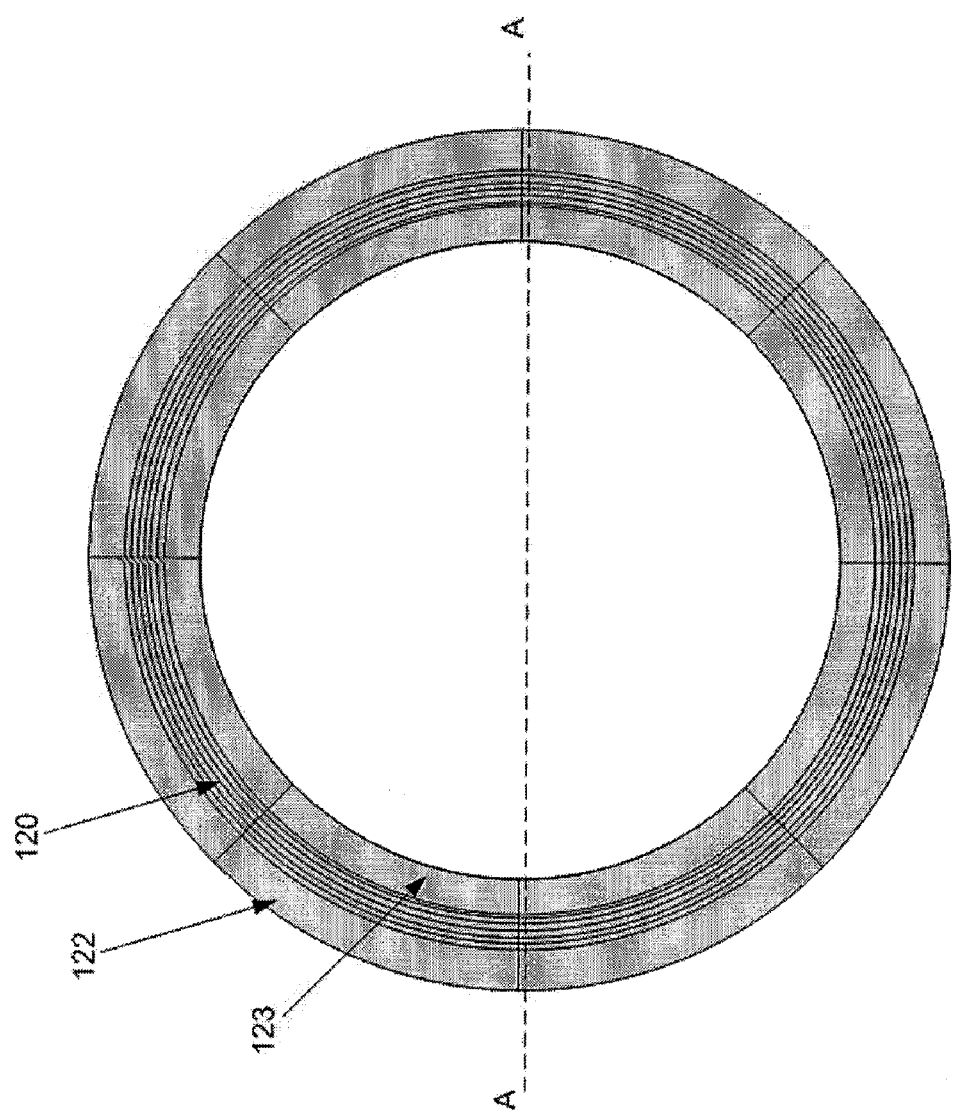
FIG. 13 shows the mating face of an example inductive connector

FIG. 13 shows the mating face of an example inductive connector suitable for use as transducers 91 of FIG. 9, 104 of FIG. 10 and the inductive power and data connector 200 of FIG. 2 or 201 of FIG. 12. Multiple circular turns 120 form the primary coil of a transformer system. A ferrous metal flux guiding structure encloses the coil and is extended to form coupling "wings" 122 and 123. The central region of the structure is open and is available to enclose local mechanical structures without significantly affecting connector performance. Section A-A is represented in detail in FIG. 14. FIG. 13 is not drawn to scale, in typical implementations the cross sectional width of the rotationally symmetric connector through section A-A, is less than the inner radius thereof.

Figure 14:
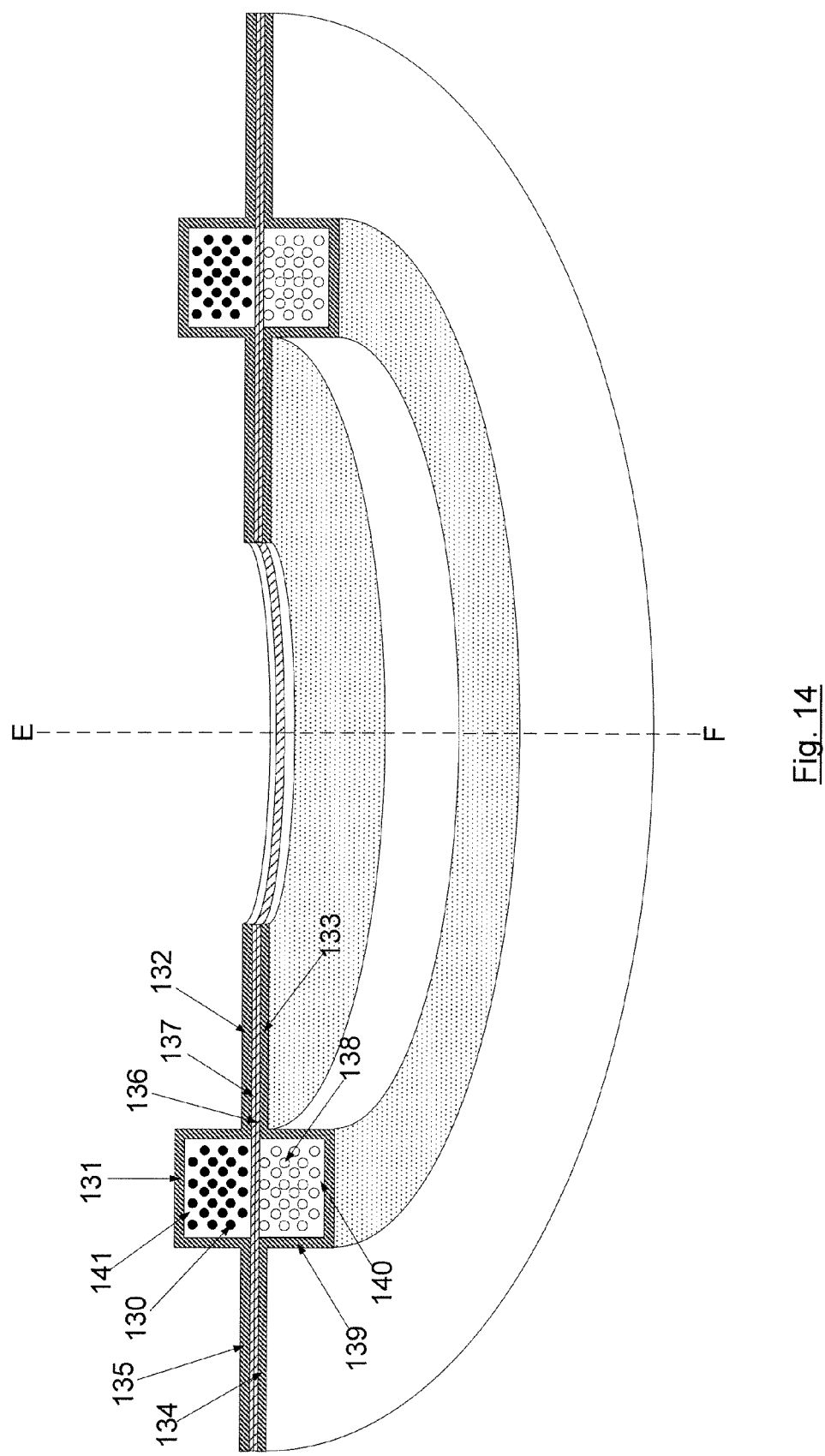
FIG. 14 shows a perspective cross sectional view through the mated inductive connector shown in FIG. 13.

FIG. 14 shows a perspective cross sectional view A-A through the rotationally symmetrical mated inductive connector shown in FIG. 12. This structure is rotationally symmetric about axis E-F. The cross section is also symmetrical about a horizontal plane and this plane of symmetry represents the mating surface between the two connector halves. A cross section through the multiple wire turns of the primary coil is represented by 130 and the similarly shaded circular elements. A flux guiding structure 131 encloses the primary coil and is elongated parallel to the mating surface to form wings 132, 133, 134 and 135. Wing structures 132, 133, 134 and 135 increase the surface area of the coupling region thereby reducing the magnetic reluctance of the gap at the connector interface. For applications which experience regular rotational movement between the two connector halves bearing surfaces 136 and 137 are formed from a material with a low coefficient of sliding kinetic friction. Layer 136 is associated with the top connector half while layer 137 is associated with the lower half. Nylon impregnated with lubricating oil is a suitable material for such applications. Layers 136 and 137 ensure a controlled separating distance between the two flux guiding enclosures and low mechanical resistance to rotational movement. The flux coupling wings of the lower connector half are represented by 134 and 133. The secondary multi-turn wire coil is represented by 138 and similarly shaded circular regions. The effective relative permeability of the whole magnetic circuit is determined almost entirely by the gap distance and relatively little by the relative permeability of the core material. Flux guides, 131 and 139, of the two mated connectors form a magnetic circuit which couples magnetic flux generated in the primary coil 130 to the secondary coil 138. The magnetic material selected for wings 132, 133, 134 and 135 may have a comparatively low value of relative permeability (for example 1000) allowing the freedom to select a material with suitable mechanical and chemical properties for this challenging underwater application. Flux guides 131 and 139 may be manufactured from a ferrous metal, for example 316 or 904L marine grade stainless steel. Regions 136 and 137 represent the areas within the flux guiding enclosure which are not fully occupied by the transformer coil materials. If water were allowed to occupy these regions it would form a shorted turn due to the partially conductive nature of impure water. A current would be induced in opposition to the transformer coils and this would impact connector efficiency. To avoid this effect, areas 140 and 141 are filled with an insulating material either continually around the connector circumference or at intervals to break the parasitic conductive circuit.

Electrical power for the components of the data access point of the present invention may be supplied over the network cable. Alternatively, power from may be supplied by a local battery supply.

Electrical power from the networked cable may also be supplied from the data access point via an inductive connector to power the remote client system.

Electrical power could alternatively be supplied by a remote client system to power the data access point. This configuration could be particularly beneficial to support communications where the network power supply has failed.

In many cases where the data transfer system of the present invention is deployed, the data access point will be situated on the sea bed and will communicate with client systems also located on or near the seabed. This arrangement is beneficial to wireless radio connection since the lower conductivity of the sea bed compared to surrounding sea water allows extended communications range for a given bandwidth compared to a signal path entirely through water.

The systems and apparatus described herein are generally applicable to seawater environments, they are equally applicable to fresh water and any brackish water environments. Since each specific water environment exhibits different electromagnetic propagation properties, specific operating conditions of the present invention may be adjusted to suit particular operating environments. Any optimisation required for specific water saline constitutions will be obvious to any practitioner skilled in this area.

The above descriptions of the specific embodiments of the present invention are made by way of example only and not for the purposes of limitation. It will be clear to the skilled person that minor modifications may be made without significant changes to the operation described. In particular, to achieve some or most of the advantages of the present invention, practical implementations may not necessarily be as exemplified herein and can include variations within the scope of the invention.

The invention claimed is:

1. An underwater data transfer system comprising
a cabled network,
at least one data access point having an access point electromagnetic transceiver and a first inductive connector
and at least one remote client system comprising a client electromagnetic transceiver and a second inductive connector
wherein, during use, said at least one data access point is operable to transfers data between said cabled network and said client electromagnetic transceiver via electromagnetic signals carried through the water and electrical power is transferrable between said cabled network and said at least one remote client system via said first and second inductive connectors.

2. An underwater data transfer system according to claim 1 wherein, during use, electrical power and data is transferred between said cabled network and said at least one remote client system via said first and second inductive connectors.

3. An underwater data transfer system according to claim 1 wherein said at least one data access point comprises a first transducer and said at least one remote client system further comprises a second transducer each said first and said second transducer being operable to transmit and/or receive electromagnetic signals in water.

4. An underwater data transfer system according to claim 3 wherein said transfer of data between said cabled network and said at least one remote client system is via said first transducer and said second transducer.

5. An underwater data transfer system according to claim 1 wherein said cabled network comprises a fibre optic cable.

6. An underwater data transfer system according to claim 1 wherein said cabled network comprises an electrically conductive cable.

7. An underwater data transfer system according to claim 1 wherein, during use, said cabled network carries electrical power.

8. An underwater data transfer system according to claim 1 further comprising a plurality of remote client systems wherein, during use, at least two of said plurality of remote client systems communicate with said at least one data access point.

9. An underwater data transfer system according to claim 1 wherein said transfer of data between said cabled network and said remote client system is via electromagnetic signals having a signal path at least partially through the seabed.

10. An underwater data transfer system according to claim 1 wherein electrical power for said at least one data access point is supplied over the cabled network.

11. An underwater data transfer system according to claim 1 wherein a first and second remote client system is provided, said first and said second remote client system being linked by a secondary cabled network providing network communications between said first and said second remote client systems.

12. An underwater data transfer system monitoring method wherein remote client systems are operable to monitor quality of service at data access points distributed throughout a cabled network as a means to diagnose cable failures.

\* \* \* \* \*